May 10, 1938.   R. C. LEGAT   2,116,726
METHOD OF MAKING FASTENER UNITS
Filed June 19, 1937    2 Sheets-Sheet 1
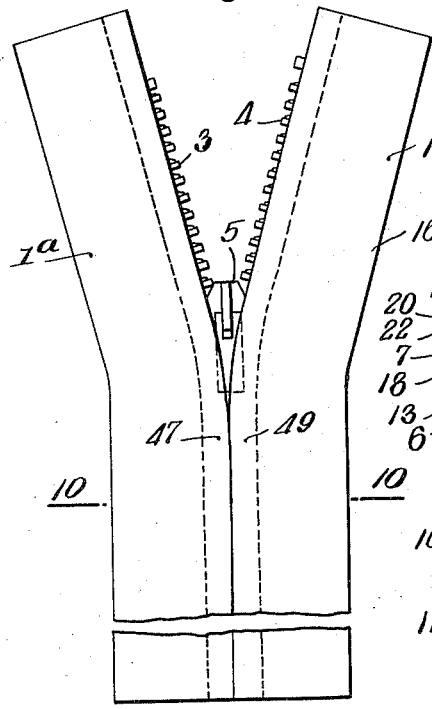
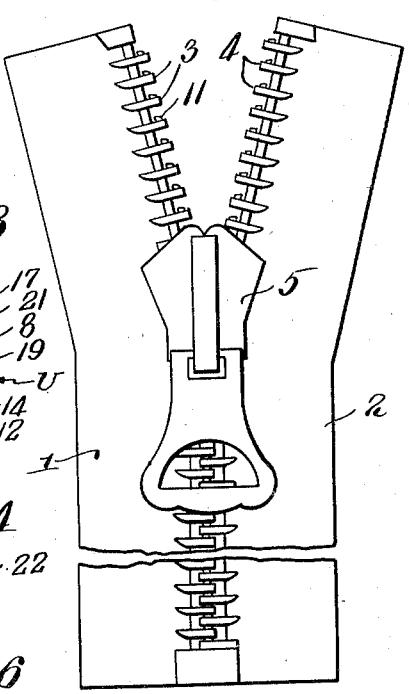
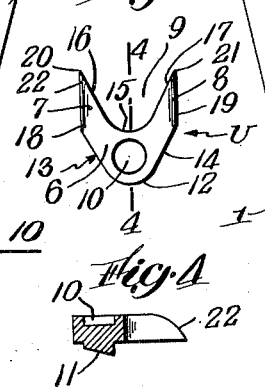
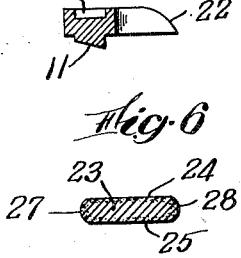
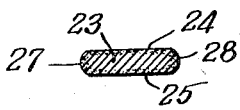
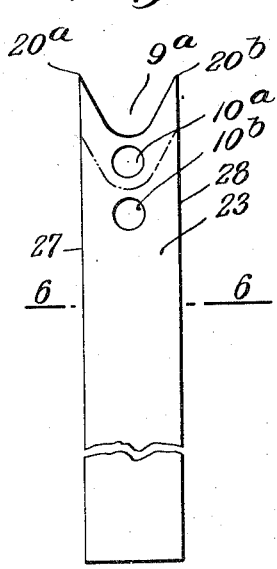
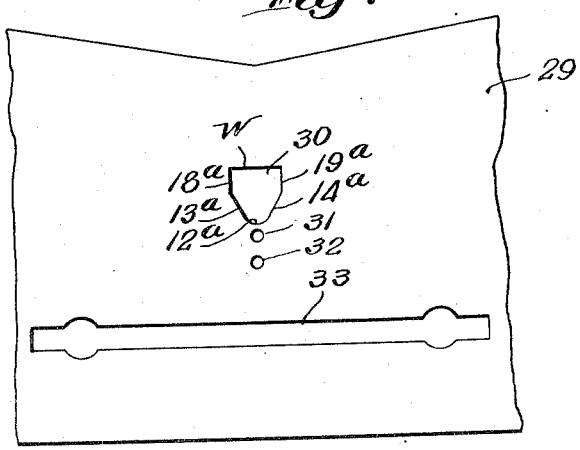
Inventor:
Robert C. Legat,
by Roberts Cushman Woodberry
Attys.

May 10, 1938.    R. C. LEGAT    2,116,726
METHOD OF MAKING FASTENER UNITS
Filed June 19, 1937    2 Sheets-Sheet 2
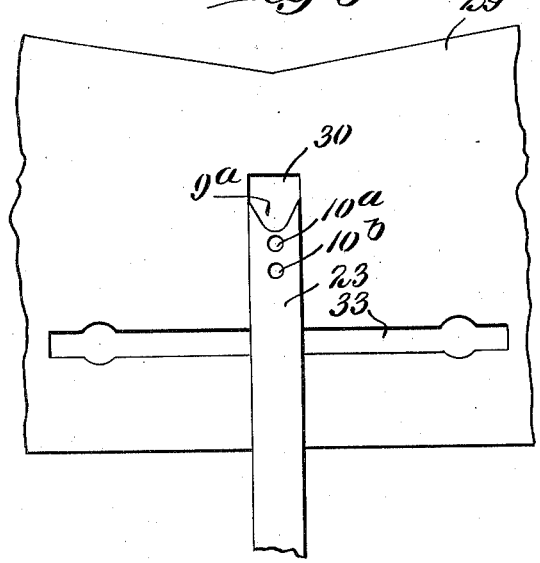
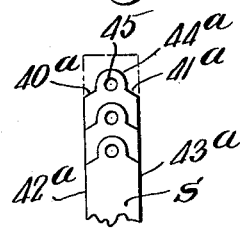
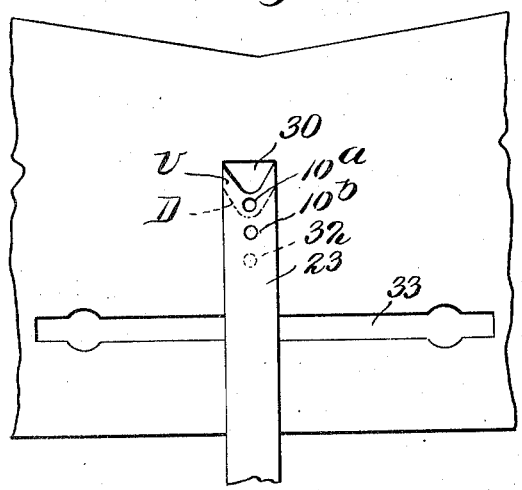
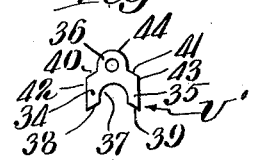
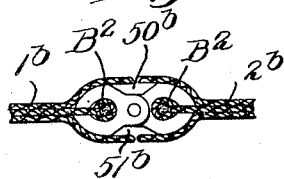
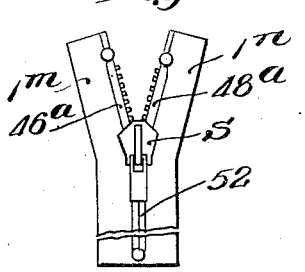
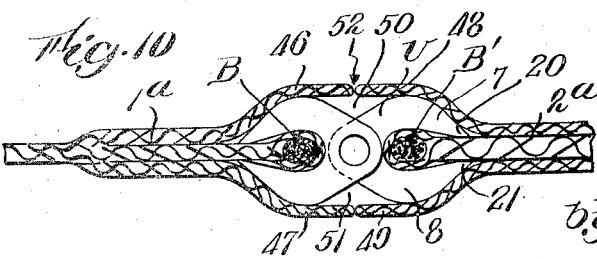

Patented May 10, 1938

2,116,726

UNITED STATES PATENT OFFICE 2,116,726

METHOD OF MAKING FASTENER UNITS

Robert C. Legat, New Britain, Conn., assignor to G. E. Prentice Manufacturing Company, New Britain, Conn., a corporation of Connecticut Application June 19, 1937, Serial No. 149,110

9 Claims. (Cl. 29—148)

This invention pertains to slide fasteners and relates more particularly to a novel method of making fastener units, the present application being a continuation-in-part of my copending application for Letters Patent Serial No. 62,065, filed February 3, 1936 upon which was granted Patent No. 2,097,099, October 23, 1937. A principal object of the present invention is to provide a novel method of making fastener units from sheet metal in such a way as to avoid waste.

A further object is to provide a method of making a fastener unit of such shape and dimensions that the amount of metal in the completed fastener is reduced substantially to a minimum; to provide a method of making a unit having attaching legs or jaws which taper inwardly toward the plane of the stringer thereby eliminating square corners and providing a neat and pleasing appearance; to provide a method of making fastener units such that the completed fastener will be flexible, light in weight, of substantially minimum front-to-rear thickness, and acceptable for use in garments of substantially all types; to provide a method of making a fastener unit especially useful in the covered type of fastener (having cover flaps for concealing the units) whereby such a covered fastener will not be unduly bulky, as compared with the uncovered fastener; and to provide a method of making a fastener unit having attaching jaws whose outer surfaces are smoothly finished and of wear-resistant character well suited to receive the thrust of the cam surfaces of the actuating slider.

Other objects and advantages of the invention will be made manifest in the following more detailed description and by reference to the accompanying drawings, wherein Fig. 1 is a fragmentary front elevation of a fastener, embodying units made in accordance with the present invention;

Fig. 2 is a view similar to Fig. 1 but illustrating a covered fastener;

Fig. 3 is a view, to large scale, showing the under side of a fastener unit made in accordance with the present invention but before it has been applied to the stringer or flexible support;

Fig. 4 is a section substantially on the line 4—4 of Fig. 3;

Fig. 5 is a fragmentary plan view, to large scale, showing a strip or ribbon of metal having a recess in its end portion such as results from cutting from the strip a fastener unit like that of Fig. 3;

Fig. 6 is a section on the line 6—6 of Fig. 5;

Fig. 7 is a fragmentary plan view, to large scale, of a bottom die member useful in making fastener units from a strip such as that of Figs. 5 and 6;

Fig. 8 is a view, generally similar to Fig. 7, showing a metal strip or ribbon, like that of Fig. 5, disposed upon the bottom die member and as it appears at the completion of the working stroke of the cooperating punch, and after the latter has been retracted;

Fig. 9 is a view similar to Fig. 8, but showing the ribbon as having been advanced in readiness for the next down stroke of the punch die;

Fig. 10 is a diagrammatic transverse section, to large scale, through a covered fastener, such as that of Fig. 2, employing units of a type herein specifically disclosed, showing the units as anchored to the edge beads of the stringers or flexible supports;

Fig. 11 is a fragmentary plan view of a length of metallic ribbon illustrating an alternative mode of procedure, in accordance with this invention, whereby fastener units of somewhat different shape are produced without waste from the ribbon or strip;

Fig. 12 is a plan view of one of the units produced in accordance with the method illustrated in Fig. 11;

Fig. 13 is a transverse section through a stringer or flexible support, showing one of the units of Fig. 12 secured to the support;

Fig. 14 is a view generally similar to Fig. 10, but to smaller scale, illustrating a covered fastener employing units such as that of Fig. 12; and Fig. 15 is a view generally similar to Fig. 2, but showing a covered fastener of a slightly different type.

Referring to the drawings, the numerals 1 and 2 (Fig. 1) designate a pair of flexible supports or stringers, each preferably provided with an edge bead and having series 3 and 4 respectively of fastener units fixed to its beaded edge. The fastener comprising these tapes is, as usual, furnished with bottom and top stops and with an actuating slider 5. The units of the series 3 and 4 are all substantially alike, the outer or projecting end of each unit being furnished with a socket in one face and with a corresponding projecting pin 11 at its opposite face. These units, before attachment to the stringer, and in accordance with a preferred embodiment of the invention, are of the general shape of the unit U, as shown in Figs. 3 and 4. The unattached unit comprises the head portion 6 and a pair of spaced anchoring jaws or legs 7 and 8, separated by a recess 9 at the inner end of the unit. The head portion of each unit, as above referred to, is furnished with a socket opening 10 (Fig. 4) in one face and with a projecting pin 11 at its opposite face.

The outer end of the head portion of the unit is rounded or curved as shown at 12 (Fig. 3) and the lateral edges 13 and 14 of this head portion preferably are substantially straight and diverge from each other, and in the unattached unit form tangents to the curved portion 12. Likewise the recess 9 of the unattached unit has a curved inner wall 15, the curvature of which is substantially identical with the curvature of the end portion 12 of the head of the unit, and the side walls 16 and 17 of the recess are substantially straight and tangent to the curved inner wall 15, being substantially parallel respectively to the lateral outer surfaces 13 and 14 of the head portion, and intersect the outer, substantially parallel surfaces 18 and 19 of the attaching jaws in sharply acute angles at the points 20 and 21, respectively. As a result of the method of making these units now about to be described, the extreme ends of the jaws 7 and 8 are usually somewhat rounded off, as shown at 22, (Fig. 4) so that the tips of the jaws taper both horizontally and vertically.

In accordance with the preferred method of making these units U, a length of metal ribbon 23, of a character suitable for the making of fastener units of this type, preferably such as is not easily corroded by moisture, is first prepared, such ribbon being of a transverse width substantially equal to the distance between the outer edges 18 and 19 of the unit before the latter is attached to its stringer, this distance substantially equaling the maximum front-to-rear thickness of the unit after its attachment to the stringer.

While this metal ribbon 23 may be made merely by shearing sheet metal to the desired width, it is preferred to prepare this ribbon by an operation including drawing or rolling such as to provide smooth, compact outer surfaces, free from burrs and requiring no further finishing operation. Thus, as indicated in Fig. 6, the ribbon 23 has the substantially flat and smooth upper and lower surfaces 24 and 25 and the lateral edges 27 and 28, such edges preferably being slightly rounded. If this ribbon be produced by a cold drawing or cold rolling operation, the metal closely adjacent to the outer surfaces will be more dense than at the central portion of the ribbon, usually with the fiber running lengthwise of the ribbon, and such outer part of the ribbon, for example, the edge portions 27 and 28, will thus be more wear resistant than though the ribbon were produced merely by shearing sheet metal. However, while it is preferred to make the ribbon by drawing or rolling operations, or at least to finish its outer surfaces by rolling or compression, the invention is not necessarily limited to the use of ribbon prepared in this way.

For the performance of the method of the present invention it is preferred to provide a punch and die apparatus comprising, for example, the lower die member 29 (Fig. 7) having an opening 30 provided with a curved wall 12ª corresponding in curvature and dimensions to the curved end 12 of the desired unit. This opening 30 is also provided with substantially straight divergent walls 13ª and 14ª corresponding to the edges 13 and 14 of the unit and with substantially parallel walls 18ª and 19ª corresponding to the edges 18 and 19 of the attaching jaws of the unit and spaced apart a distance substantially equal to the width of the strip 23. The wall W of this opening 30 is substantially straight and perpendicular to the walls 18ª and 19ª and is spaced from the most distant part of the curved wall 12ª a distance equal to the maximum length of the unit to be formed. The die 29 is also furnished with one, but preferably two circular openings 31 and 32 corresponding in dimensions to the projection 11 which is formed on each unit, the centers of the openings 31 and 32 being spaced apart a distance substantially equal to the distance between the curved walls 12 and 15 of the unit.

The punch (not shown), which cooperates with the die 29, is provided with a part which substantially fits the opening 30 so as to cooperate with the edges of the opening 30 in forming a shear cut and is also furnished with a pair of plungers adapted to cup the metal down into the openings 31 and 32 but without shearing through the metal. Preferably die 29 is furnished with a slot 33 for the reception of a stripper device (not shown) for lifting the metal from the die 29 after each punching operation. Since this stripper forms no essential part of the present invention, it is not herein illustrated.

In preparation for the operation of making the units U by the use of the punch and die, the extreme end of the metal ribbon or strip 23 is first shaped as shown, for example, at 9ª in Fig. 5, so as to have a recess corresponding to the recess 9 of the desired unit, the ribbon terminating at its opposite edges in acute points 20ª and 20ᵇ. This shaping of the extreme end of the ribbon may be done in any desired manner, although ordinarily by the use of the punch and die, the first operation of the punch and die producing a small piece of waste metal corresponding in shape to the recess 9ª, this being the only waste which is produced during the operation.

Having shaped the end of the ribbon as just described, for example by the use of the punch and die, and assuming that the latter method has been used, the ribbon, at the end of this first operation, will occupy the position shown in Fig. 8, the punch having produced the two socket openings or depressions 10ª and 10ᵇ in the ribbon outside of the limits of the recess 9ª. The punch having now been retracted, the ribbon is advanced to the position shown in Fig. 9, the projection which was formed in the die opening 31 now overlying the edge of the opening 30, while the projection which was initially formed in the die opening 32 now seats in the opening 31 of the die 29 and thus serves accurately to space the ribbon with reference to the opening 30 preparatory to the next descent of the punch. The punch now moves downwardly into the opening 30 and punches out a complete unit U, forming a severing cut or incision along the dotted line D in Fig. 9 and at the same time again cupping the metal down into the opening 32 of the die. It may be noted that the incision at the line D extends completely across the ribbon 23 from one lateral edge to the other of the latter and that this incision intersects the lateral edges in acute angles which define the extreme ends 20 and 21 of the jaw members of the next unit to be cut. The punch is now lifted, the ribbon advanced forwardly one step, and the punch again caused to descend, thus at each stroke of the punch cutting off a complete unit without producing any appreciable waste whatsoever after that resulting from the initial formation of recess 9ª.

Since the metal at the extreme ends of the attaching jaws is very thin, the friction of the punch in shearing the metal tends to draw or compress these extreme ends so that they assume some such form as indicated at 22 in Fig. 4, the tips of the jaws thus tapering both vertically and horizontally.

Having prepared the units U, these units may be secured to the beaded edge of the stringer by any suitable mechanism such as has commonly been used in this art for uniting independent units to stringer tapes. In Fig. 10, the units U are shown as having been attached to tapes 1ᵃ and 2ᵃ having the edge beads B and B' respectively. Each unit is so disposed that its spaced jaws 7 and 8 straddle the edge bead, and then the jaws 7 and 8 are subjected to lateral pressure tending to cause the metal to flow, thereby bending the jaws so that their tips 20 and 21 approach each other, thus firmly clamping the edge bead between them. When the unit has been finally fixed to the stringer, the tips 20 and 21 lie substantially in the planes of the opposite faces of the stringer tape or may be somewhat indented into the tape, since the pressure tends to compress the tape where it is engaged between the jaws.

The curved inner surface 15 of the recess is so located that when the unit is anchored in place, the unit is of maximum front-to-rear thickness substantially in the vertical front-to-rear plane of the edge bead, the outer surfaces of the attaching jaws now being smoothly curved and the unit tapering in thickness from this point of maximum thickness in both directions, that is to say, toward its outer curved end, and toward its inner end at which the tips of the jaws merge with the surfaces of the tape.

By reason of the fact that the outer curved end of the unit is relatively narrow as compared with the maximum thickness of the unit,—shallow longitudinal channels 50 and 51 are formed at the front and rear of the fastener when the units of the opposite series are interengaged. As illustrated in Fig. 10, the stringer tapes 1ᵃ and 2ᵃ are provided with covering flaps 46 and 47, and 48 and 49, respectively, which, as illustrated, are woven integrally with the tapes 1ᵃ and 2ᵃ, respectively. These covering flaps are designed substantially to cover the units when the fastener is closed and the edges of the flaps at the same side of the fastener substantially meet along a line such as indicated at 52 (Fig. 10). In such an arrangement, the channels 50 and 51 are of assistance in helping to keep the free edges of the flaps 46 and 48 in substantial alignment,—particularly in that type of fastener shown in Fig. 15 in which the slider channels receive the flaps 46 and 48 so that the slider, as it moves up and down, irons the flaps back into the channels 50 and 51.

A fastener of this general type is illustrated in Fig. 15 wherein the stringers 1ᵐ and 1ⁿ are shown as provided with the cover flaps 46ᵃ and 48ᵃ, respectively, and in which the slider S overrides the flaps and, in drawing the opposed series of units together, pulls the free edges of the flaps into substantial engagement along the line 52. If desired, in such an arrangement as that shown in Fig. 15, the flaps 46ᵃ and 48ᵃ may initially consist of a single piece of textile or other sheet material which is secured to the respective stringers so as to extend continuously across the united series of fasteners and which is then cut by means of a knife or other suitable instrument, along the line 52, thereby producing edges which are the exact counterpart of each other and thus capable of covering the units completely. However, these edges are raw edges and it is usually preferred, as a commercial matter, to make the flaps 47 and 49 as shown for example in Fig. 10, so that they have selvage edges which will withstand the wear of movement of the slider.

In Fig. 2 a different embodiment of covered fastener is illustrated, corresponding more exactly to the arrangement of Fig. 10, the slider channels of the slider 5 (Fig. 2) receiving the series 3 and 4 of the fastener units but not receiving the edges of the covering flaps 47 and 49.

As illustrated in Figs. 11 to 14 inclusive, the invention also contemplates the provision of fastener units of somewhat different shape from those shown in Figs. 3 and 4, for example, although, like the latter, capable of being made without waste of material. Thus, referring to Fig. 12 the unattached unit U' comprises the attaching legs or jaws 34 and 35 and the head portion 36. The attaching or anchoring jaws or legs 34 and 35 are spaced apart by a recess 37, the latter preferably having substantially parallel side walls and an arcuate inner end wall. The free ends of these legs or jaws preferably are inclined, as indicated at 38 and 39, respectively, so as to converge toward the inner end of the recess,—these ends 38 and 39 hereinafter being referred to as the "inner" ends of the unit, while the head 36 is referred to as the "outer" end of the unit. This head 36 is of substantially less width than the main body of the unit, preferably being of an external width not substantially greater than the thickness of the edge bead to which the unit is to be attached,—the head being in fact of substantially the same size and shape as the recess 37. At each side of the head the unit body terminates in inclined shoulders 40 and 41, respectively, which converge toward the outer end of the unit, the outer edges 42 and 43 of the jaws of the unattached unit being substantially parallel, while the end surface 44 of the head is of curved contour. The shoulders 40 and 41 in the unattached unit are substantially parallel to the end surfaces 38 and 39, respectively, of the legs.

This unit, like that of Figs. 3 and 4, may be made very economically and without any waste of material, as indicated diagrammatically in Fig. 11. In thus manufacturing the units, a ribbon or strip S of sheet metal, preferably of the type indicated in Fig. 6 as above described, is provided, such strip having the substantially parallel edges 42ᵃ and 43ᵃ spaced apart substantially the same distance as the outer surfaces 42 and 43 of the unattached unit of Fig. 12. This ribbon or strip S is advanced by successive steps into the field of action of a cooperating die and punch suitably shaped, and which operate in substantially the same manner as the die and punch above referred to, to cut off successive units from the end of the strip. At each operation of the punch an incision is made which extends completely across the width of the strip, such incision comprising the curved central portion 44ᵃ (Fig. 11) and the lateral, divergent straight portions 40ᵃ and 41ᵃ. Each incision completely severs the strip and each incision at the same time forms the inner end of one unit and the outer end of the next unit. Simultaneously with, or before or after the actuation of the cutting punch, the material of the strip is subjected to the operation of a cupping element which forms a projecting pin 45 on one surface of the head and a corresponding socket (not shown) in the opposite face of the head.

It will be noted that, as a result of this mode of procedure, the outer edges 42 and 43 of the unit are unchanged portions of the original edges 42ª and 43ª of the strip S,—the head 36 of each unit representing that part of the original material which is removed in making the recess 37 of the next unit, while the shoulders 40 and 41 of one unit correspond to the inclined ends 38 and 39 of the jaws of the next unit. Thus no waste whatsoever is produced.

After the units have been formed to the shape shown in Fig. 12, they are attached to the edge bead of the stringer by means of any suitable mechanism, either one-by-one in succession, or in groups in accordance with the type of mechanism employed. If preferred, they may be subjected to some suitable finishing operation before attaching them to the stringer, although this is not necessary in all cases, since the outer edges 42 and 43 at least of the attaching jaws may be made very smooth and with a finished surface in accordance with the above mode of producing the units, providing the ribbon has smooth edges to start with.

In attaching the unit to the edge bead of the stringer, pressure is applied to the spaced legs or jaws 34 and 35 so that the metal is bent and caused to flow until the parts take substantially the position indicated in Fig. 13. The jaws 34 and 35 are thus caused to embrace the edge bead B² of the stringer T, and in thus compressing the unit the end surfaces 38 and 39 of the jaws are brought very nearly into parallel relation and into contact with the opposite faces of the stringer tape, while the outer edges of the jaws are curved as indicated at 42ˣ and 43ˣ and caused to assume such a relative position that they diverge from their inner or free ends toward the mid-portion of the unit. Thus in the attached unit the points P and P', which substantially represent the junctions of the surfaces 40 and 42ˣ and of the surfaces 41 and 43ˣ, respectively, define the thickest part of the unit. In fact the stringer-engaging portion of the unit, in plan view when attached, is somewhat suggestive of a circular triangle or a conventional heart-shape.

It may be noted that the point of greatest front-to-rear thickness lies substantially in the front-to-rear plane of the points P—P' and that this plane is closely adjacent to the front-to-rear plane of the axis of the bead and that the unit decreases in thickness from this plane P—P' toward both its inner and outer ends.

As illustrated in Fig. 14, when units U' of this latter type are attached to the beaded edges B² of stringer tapes 1ᵇ and 2ᵇ, respectively, longitudinal channels 50ᵇ and 51ᵇ are formed at the front and rear of the closed fastener and such channels are of somewhat greater depth and dimensions than the channels 50 and 51 which are formed by the use of the units U above described. Thus units U', such as shown in Figs. 11 to 14, may sometimes be preferred in making covered fasteners of the type shown in Fig. 15 wherein the slider overrides the covering flaps and is intended to iron the flaps backwardly so as to cause them to lie flat during the use of the fastener.

While certain desirable embodiments of the invention have been described by way of example, it is to be understood that the invention is not necessarily limited to these precise constructions or modes of procedure but is to be regarded as broadly inclusive of any and all equivalents, either in materials or apparatus employed or of process steps, as well as any other sequence of process steps than herein specifically described but which produces the same ultimate result.

I claim:

1. Method of making fastener units for use in slide-actuated fasteners, which comprises as steps providing a length of metal ribbon of a width substantially equaling the desired maximum width of the unit, advancing said ribbon endwise step-by-step into the field of action of cutting and forming devices, and at each successive step severing the ribbon by a single incision which extends completely across the width of the ribbon, said incision including a curved central portion and divergent, substantially straight side portions, the latter intersecting the respective edges of the ribbon in acute angles.

2. Method of making fastener units for use in slide-actuated fasteners, which comprises as steps providing a length of metal ribbon of a width substantially equaling the desired maximum width of the unit, advancing said ribbon endwise step-by-step into the field of cutting and forming devices, and at each successive step severing the ribbon by a single incision which extends completely across the width of the ribbon, said incision having a contour substantially corresponding to the desired shape of the outer end portion of the unit and meeting the respective edges of the ribbon in acute angles.

3. That method of making fastener units for use in slide-actuated fasteners, which comprises as steps providing a length of metal ribbon of a width substantially equal to that of the desired maximum transverse width of the unit, cutting said ribbon transversely, the incision extending across the entire width of the ribbon and being of a contour substantially corresponding to the desired finished shape of the outer end portion of the unit and meeting the respective edges of the ribbon in acute angles which define the extreme inner ends of the attaching jaw portions of the unit, and making a second incision identical in shape with the first but spaced longitudinally of the ribbon a distance equaling the distance by which the outer end of the unit, when attached, shall project beyond the edge of its flexible support.

4. That method of making fastener units for use in slide-actuated fasteners, which comprises as steps providing a length of metal ribbon of a width substantially equal to that of the desired maximum transverse width of the unit, shaping the end of the ribbon to a contour substantially corresponding to the desired shape of the outer end portion of the unit and thereafter making successive spaced, like incisions, each extending across the entire width of the ribbon and each of a contour like that of the shaped end of the ribbon and intersecting the respective edges of the ribbon in acute angles which define the extreme inner ends of the attaching jaws of each successive unit, the first incision being spaced from said shaped end of the ribbon and successive incisions being spaced from the next each by a distance equaling the distance by which the outer end of the unit, when attached, shall project beyond the edge of its flexible support.

5. Method of making like fastener units in succession, each unit having an outer or head portion having a curved end contour and provided with a pin and socket, and a pair of spaced attaching jaws separated by a recess, the inner part of the recess of the unattached unit being of substantially the same contour and dimensions as the head portion of the unit, said method comprising as steps providing a length of metal ribbon of a width substantially equal to the maximum transverse width of the desired unit, said ribbon having edge portions which are hard, dense and wear resistant, cutting units in succession without waste from said ribbon, each by a single incision which extends completely across the width of the ribbon, each incision intersecting the respective edges of the ribbon at points defining the extreme ends of the attaching jaws of the unit, successive incisions being so spaced longitudinally of the ribbon that the outer surfaces of the jaws of each unit consist of unchanged portions of the respective edges of the ribbon.

6. Method of making fastener units for use in slide-actuated fasteners which comprises as steps providing a length of metal ribbon having smooth and dense edges such as result from cold working the metal, advancing the ribbon endwise into the field of action of cutting dies, incising the metal by a cut which extends from one edge to the other and of a contour such as to form a recess in the end of the ribbon, said recess having an arcuate inner end and divergent walls which meet the edges of the ribbon in acute angles, cupping the material of the ribbon at a point inwardly of the end of the recess to provide a socket in one face and a pin projecting from the opposite face, again advancing the ribbon relatively to the dies and again actuating the dies to form a second cut, spaced longitudinally of the ribbon from the first, but identical in contour with the first cut, thereby to sever a completed unit from the length of ribbon, said unit having jaw portions which taper toward their free ends.

7. Method of making fastener units for use in slide-actuated fasteners which comprises as steps cutting from a length of sheet material a piece shaped to constitute spaced attaching jaws separated by a recess and which taper acutely toward their free ends, and a head portion of substantially the same contour and dimensions as the recess, and cupping the material of the head to form a socket in one face and a pin projecting from the opposite face.

8. Method of making fastener units for use in slide-actuated fasteners which comprises as steps cutting from a length of metal ribbon a piece shaped to constitute spaced attaching jaws whose outer edges are unchanged portions of the respective edges of the ribbon and which taper acutely toward their free ends, said jaws being separated by a recess having divergent side walls merging with an arcuate inner wall, and a head portion of substantially the same external contour and dimensions as the recess, and cupping the material of the head to form a socket in one face and a pin projecting from the opposite face.

9. Method of making fastener units for use in slide-actuated fasteners which comprises as steps cutting substantially like pieces in succession from a length of metal ribbon in such a way that each piece comprises spaced attaching jaws whose outer edges are unchanged portions of the respective edges of the ribbon, and which taper acutely toward their free ends, said jaws being separated by a recess having divergent walls which meet the edges of the ribbon at acute angles, and a head portion substantially identical in contour and dimensions with the recess, and cupping the material of the head to form a socket in one face thereof and a pin projecting from the opposite face.

ROBERT C. LEGAT.